United States Patent
Li et al.

(10) Patent No.: US 7,781,511 B2
(45) Date of Patent: *Aug. 24, 2010

(54) SILICA-CONTAINING NUCLEATING AGENT COMPOSITIONS AND METHODS FOR USING SUCH COMPOSITIONS IN POLYOLEFINS

(75) Inventors: Jiang Li, Spartanburg, SC (US); Jiannong Xu, Spartanburg, SC (US); Michael J. Mannion, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 933 days.

This patent is subject to a terminal disclaimer.

(21) Appl. No.: 11/224,501

(22) Filed: Sep. 12, 2005

(65) Prior Publication Data

US 2007/0060697 A1 Mar. 15, 2007

(51) Int. Cl.
*B60C 1/00* (2006.01)
*C04B 40/00* (2006.01)
(52) U.S. Cl. ..................... 524/493; 106/819
(58) Field of Classification Search ................. 524/493; 106/819
See application file for complete search history.

(56) References Cited

U.S. PATENT DOCUMENTS

| | | | |
|---|---|---|---|
| 4,532,280 A | 7/1985 | Kobayashi et al. | 524/108 |
| 4,954,291 A | 9/1990 | Kobayashi et al. | 252/315.1 |
| 6,245,843 B1 | 6/2001 | Kobayashi et al. | 524/109 |
| 6,313,204 B1 | 11/2001 | Kobayashi | 524/109 |
| 6,417,254 B1 | 7/2002 | Kobayashi | 524/108 |
| 6,673,856 B1 | 1/2004 | Mentink | 524/110 |
| 6,913,829 B2 * | 7/2005 | Xu et al. | 428/403 |
| 2003/0109610 A1 | 6/2003 | Nomoto et al. | 524/108 |
| 2005/0075433 A1 | 4/2005 | Mannion et al. | 524/285 |

FOREIGN PATENT DOCUMENTS

| | | |
|---|---|---|
| CN | ZL 96192324.5 | 3/2002 |
| JP | 2003096246 | 4/2003 |
| KR | 2003-0049512 | 6/2003 |

\* cited by examiner

*Primary Examiner*—William K Cheung
(74) *Attorney, Agent, or Firm*—Robert M. Lanning

(57) ABSTRACT

Diacetals of sorbitols and xylitols are employed in polyolefins as nucleating agents. Diacetals of sorbitols and xylitol nucleating agents may be provided in granular or powder form from hoppers or mixing equipment into polyolefins during the formation of polymeric compositions and polymeric articles. Flow of diacetals of sorbitols and xylitols is improved by the use of certain silicas, in certain defined weight percentages. Submicron size range silica compounds may provide excellent flow enhancement properties when blended and used with diacetals of sorbitols and xylitols powder compounds. A hydrophobic silica mixed with diacetals of sorbitols and xylitols compounds also may provide enhanced flow properties for such mixture, as compared to mixtures using hydrophilic silica. Loading ranges of silica may be important in improving the flow of diacetals of sorbitols and xylitols compounds.

10 Claims, 7 Drawing Sheets

COMMERICAL DMDBS

COMMERICAL DMDBS
*Figure -1-*
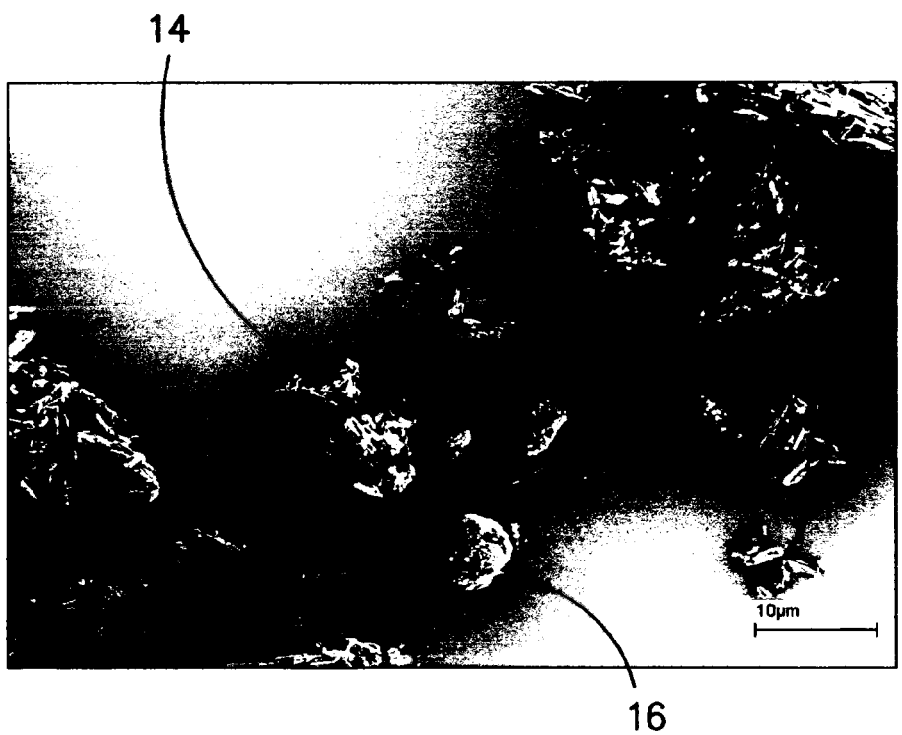
DMDBS WITH MICRO-SIZE RANGE SILICA
*Figure -2-*

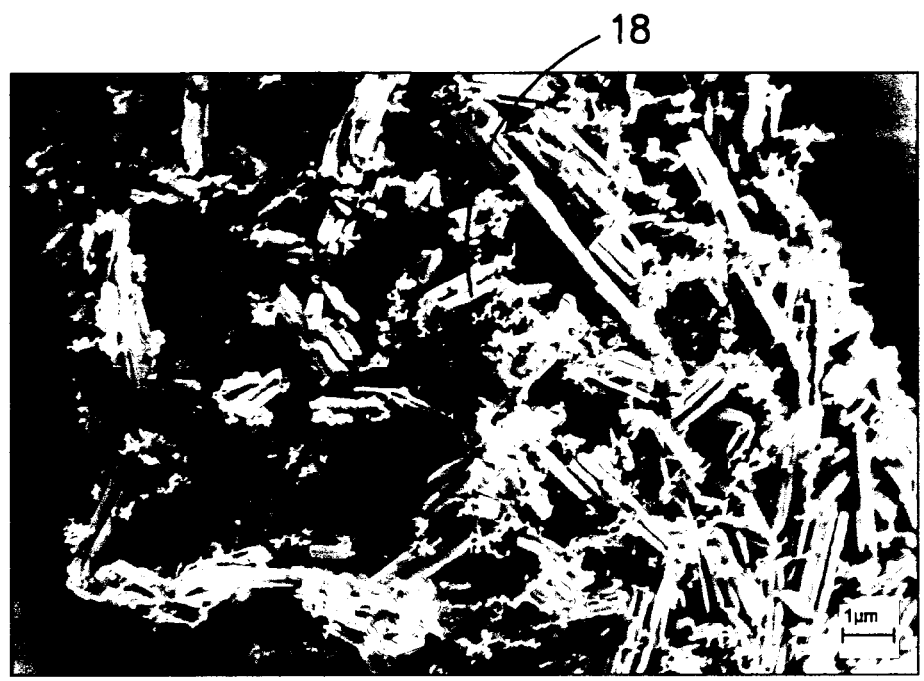
DMDBS WITH SUBMICRON-SIZE RANGE SILICA
*Figure −3−*
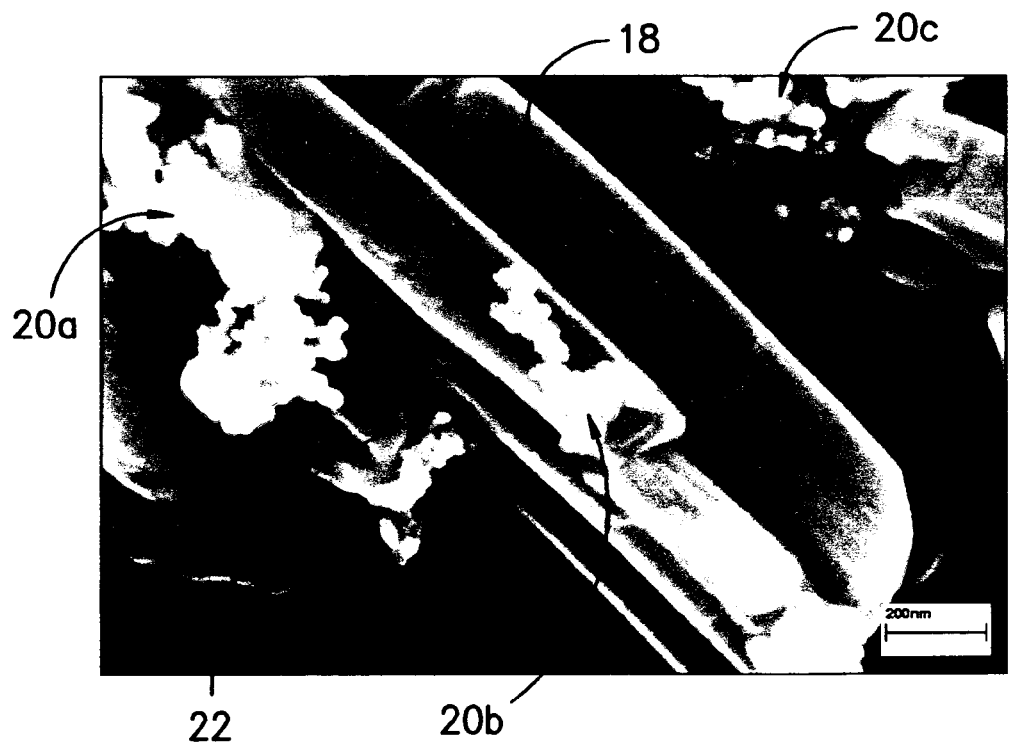
*Figure −4−*

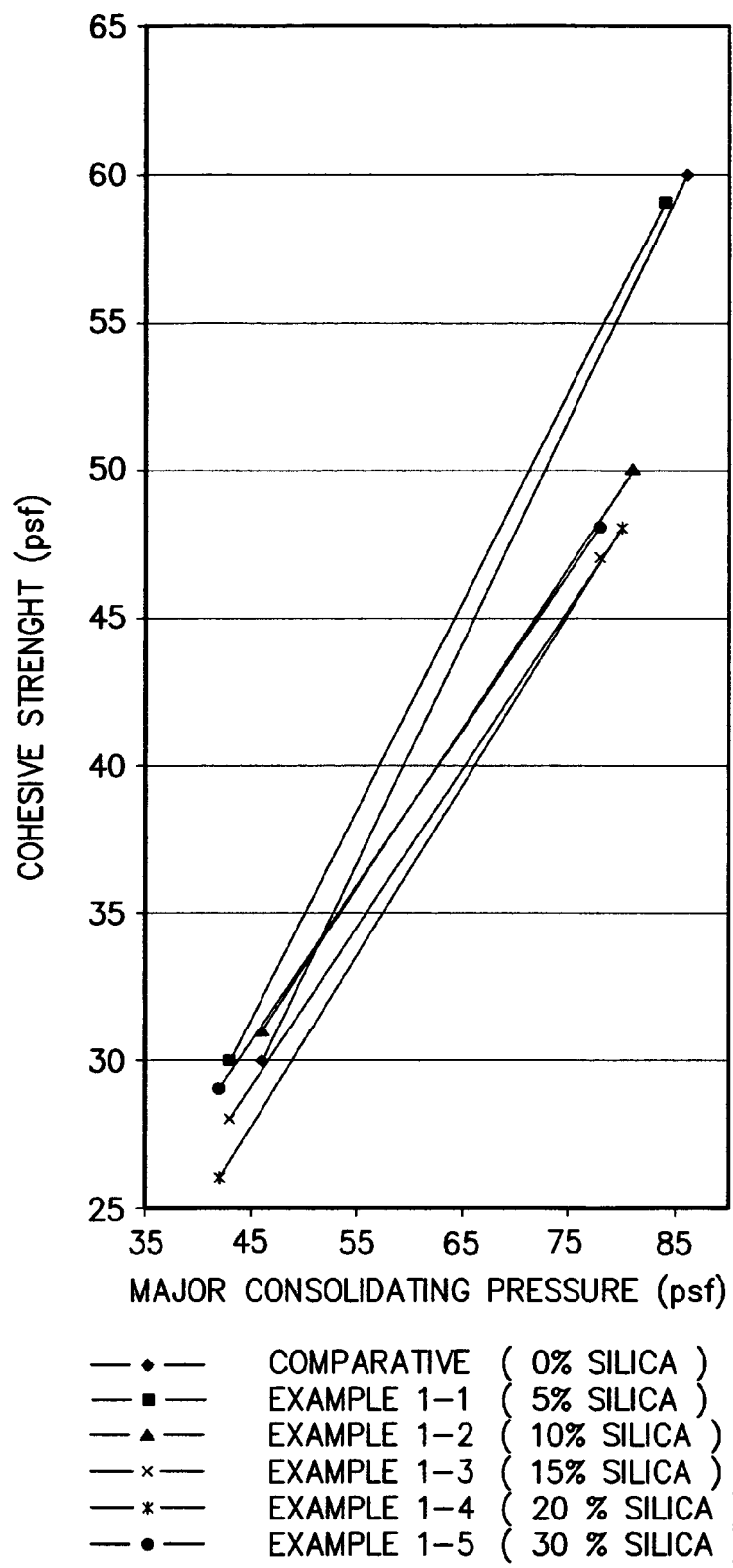
LOADING LEVEL COMPARISON FOR MICRON-SIZED SILICA
Figure −5−

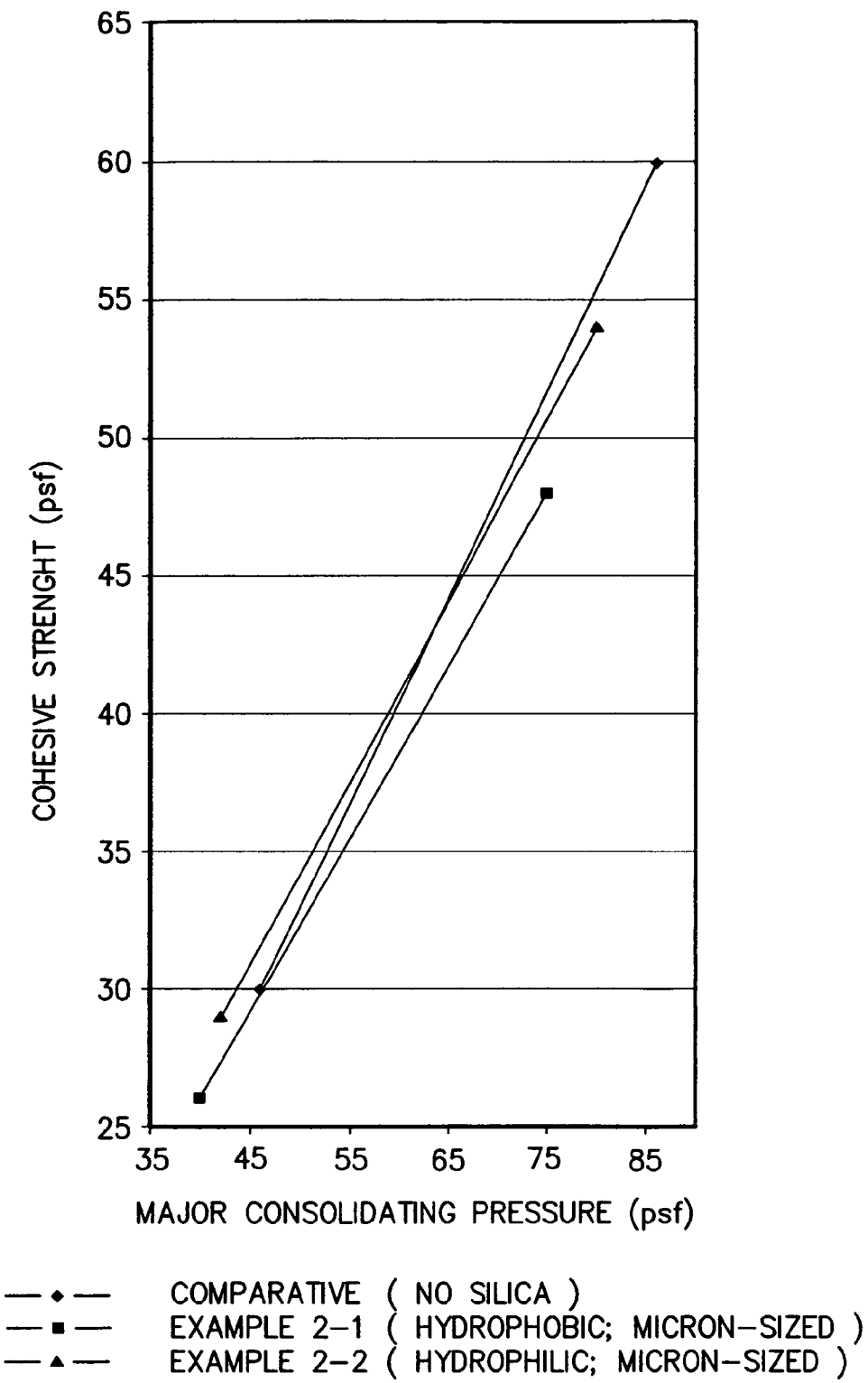
Figure −6−

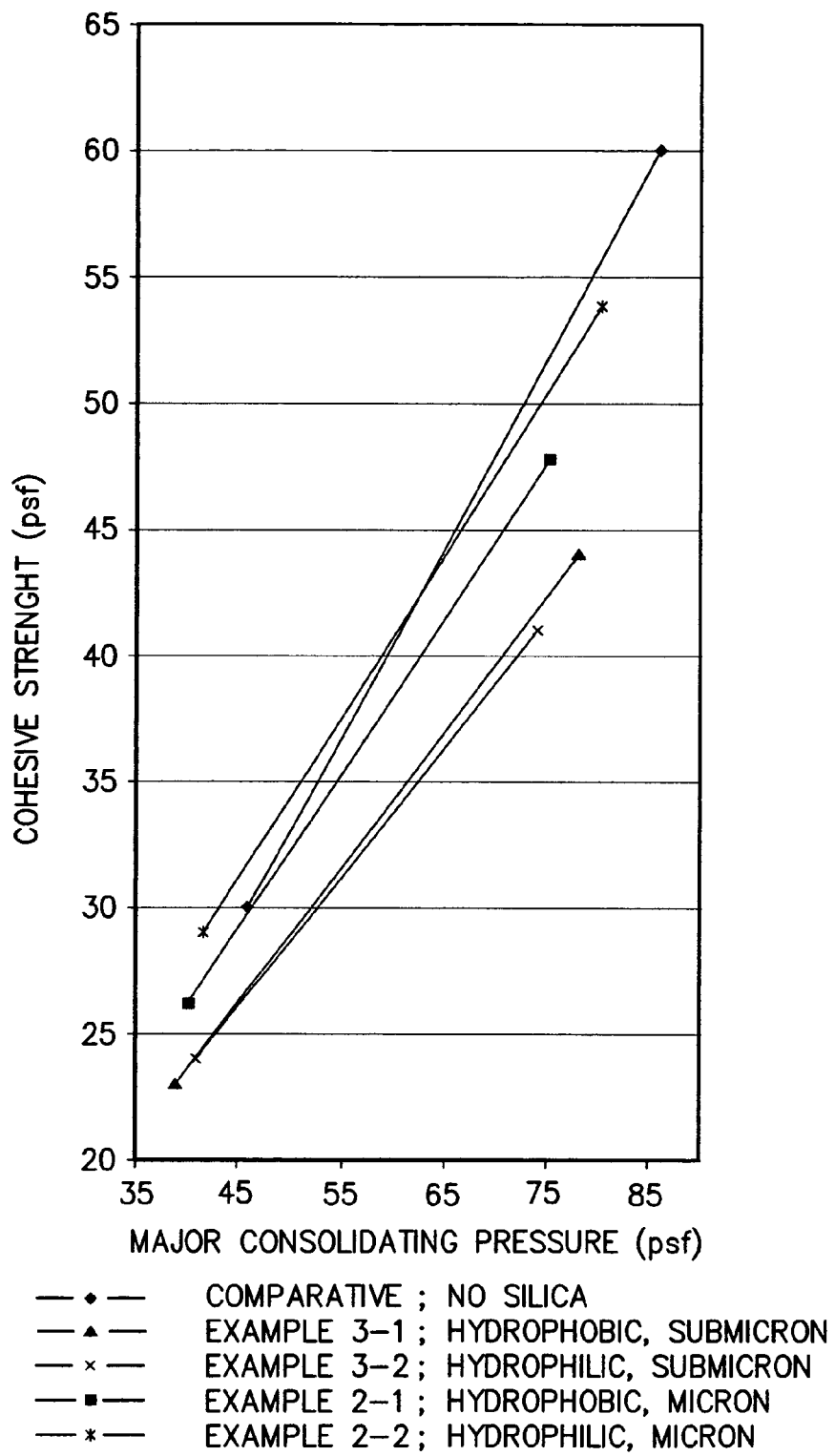
Figure -7-

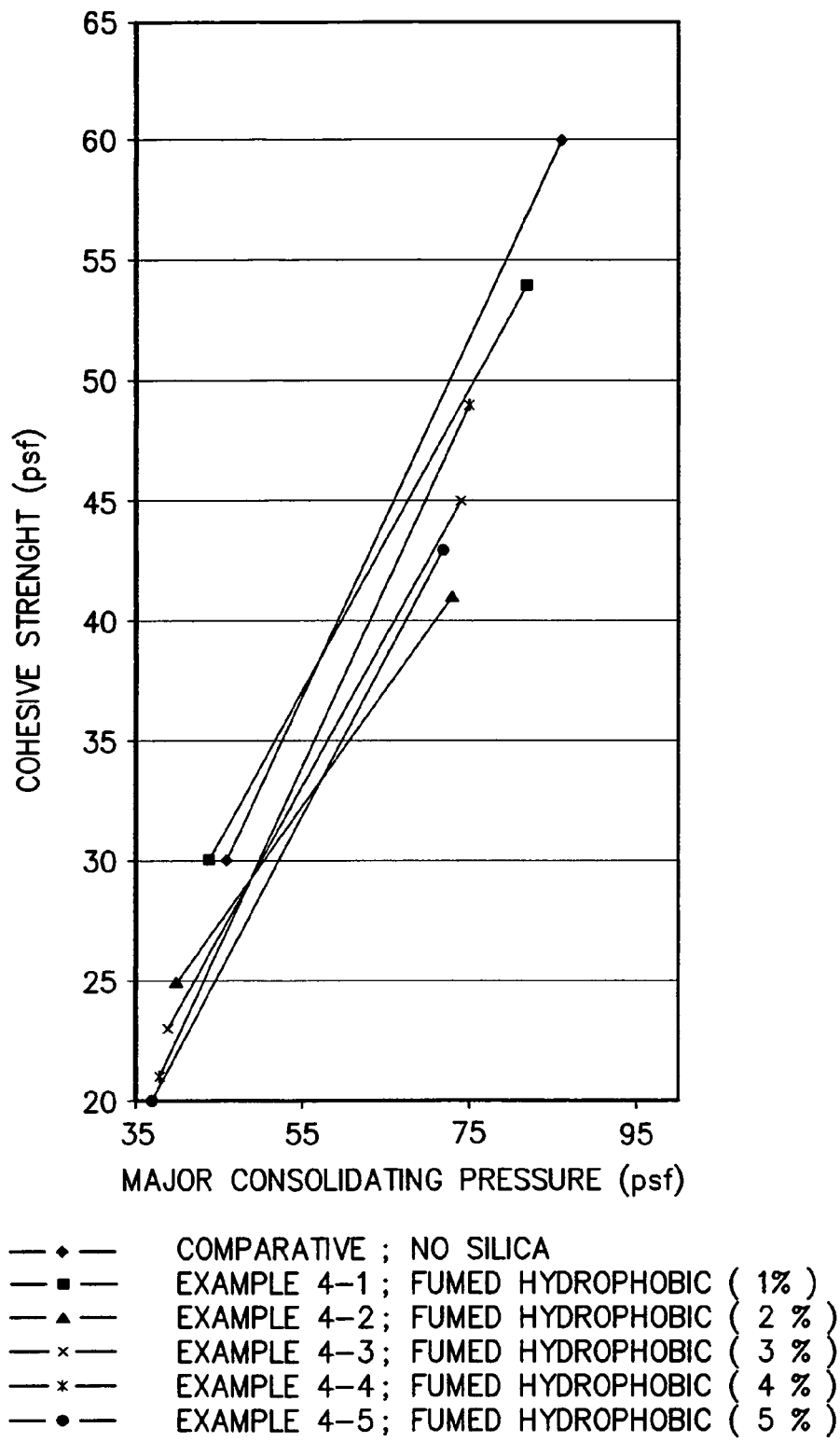
Figure -8-

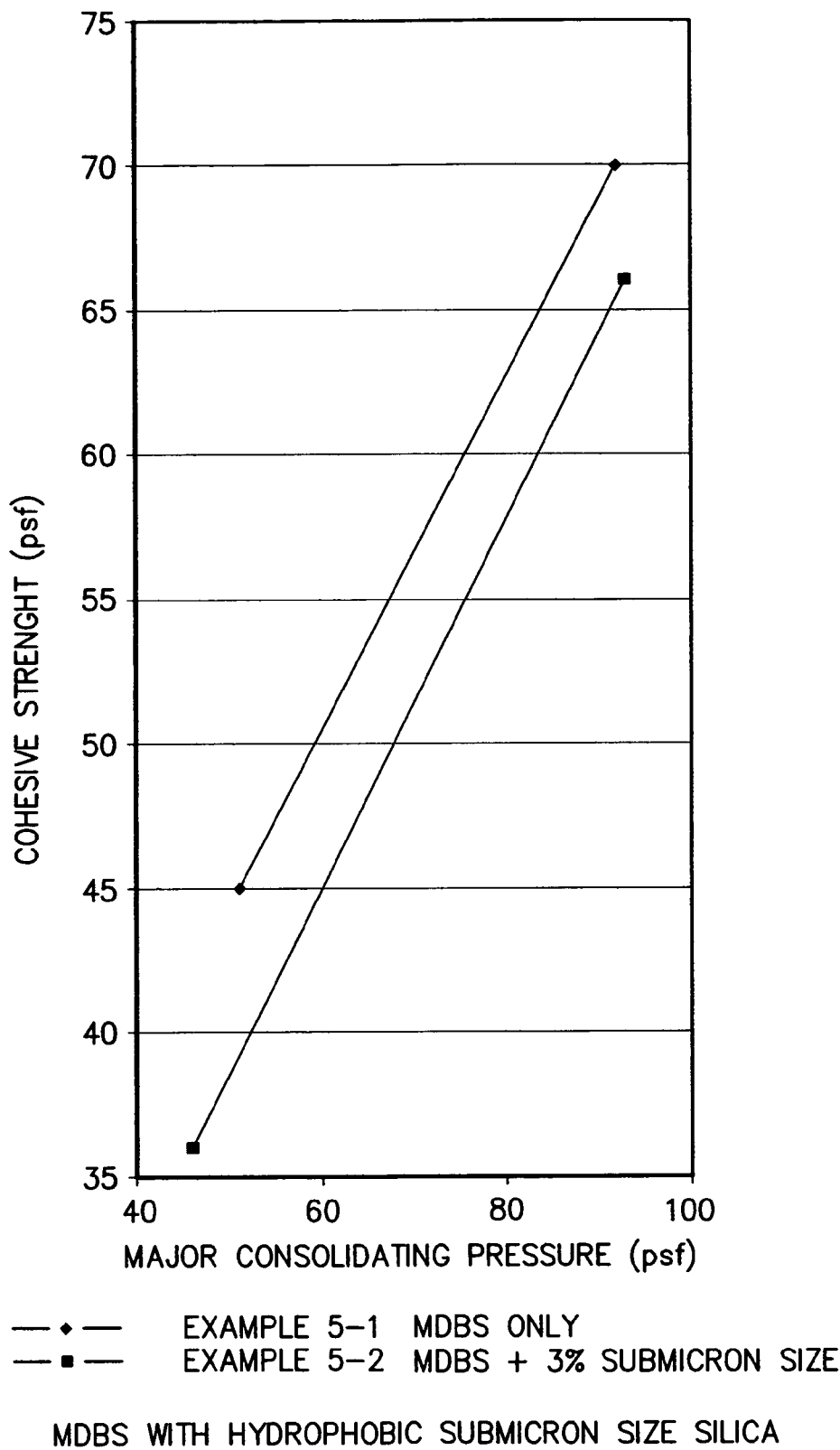
Figure −9−

US 7,781,511 B2

SILICA-CONTAINING NUCLEATING AGENT COMPOSITIONS AND METHODS FOR USING SUCH COMPOSITIONS IN POLYOLEFINS

BACKGROUND OF THE INVENTION

Sorbitol acetals are employed in polyolefins as nucleating agents. Nucleating agents provide improved properties to polymers, including speeded polymer crystallization and reduced haze. One nucleating agent in widespread use is 1,3-2,4 di(benzylidene) sorbitol (known as "DBS"), which is sold by Milliken & Company as Millad® 3905 brand nucleating agent. Other sorbitol acetal compounds used as nucleating agents include: (1) bis(3,4-dimethylbenzylidene) sorbitol (sold by Milliken & Company as Millad® 3988 brand nucleating agent, also known as "DMDBS"); and (2) bis(p-methylbenzylidene) sorbitol, sold by Milliken & Company as Millad® 3940 brand nucleating agent ("MDBS").

In polymer manufacturing and operations, sorbitol acetals may be provided as an additive powder from a hopper into polyolefin processing equipment for mixing with polymer. Commercial DMDBS in powder form is shown in FIG. 1, and DMDBS crystal 9 is seen in the upper right portion of the FIG. 1.

Sorbitol acetals sometimes do not flow readily or easily from such hoppers, which is a continuing challenge for operators of polymer additive equipment. Sorbitol acetals are inherently cohesive and compressible, which contributes to operational flow problems. Flow problems may manifest themselves as bridging and plugging, which sometimes results in reduced flow, or no flow at all. This is an operational problem for polymer mixing operations.

There are at least two common industry approaches to alleviate flow problems. The first approach employs neat sorbitol acetal powder with specially designed equipment and procedures for increasing flow of the sorbitol acetal. The drawbacks of this approach include: (1) it can be expensive to design special equipment; and (2) it may not be feasible or practical to change procedures for sorbitol acetal addition in a production plant.

A second approach is to use a pre-blend which contains a chosen diacetal of sorbitol as one component and other additives at certain ratios. The pre-blends are normally provided in the form of agglomerated pellets or granules to improve flow properties. The literature that discloses this approach includes: U.S. Pat. No. 6,673,856 (Mentink), U.S. Pat. No. 6,245,843 (Kobayashi, et al.), and Korean Published Patent Application No. 2003-0049512 ("Kwun"). Operational flexibility may be sacrificed due to the fixed ratio among different additives. Pre-blends of this type may have negative effects on the optical performance of the resulting clarified polymer parts, such as undesirable white specks or flecks in finished polymeric parts of polyolefins having pre-blended sorbitol diacetals.

Kwun describes a method of solving flow and injection problems associated with sorbitol acetal nucleating agents using organic lubricants. Kwun suggests coating the sorbitol acetal containing compound with an organic material (i.e. "lubricating component"). Kwun specifically suggests employing organic lubricants such as R—COOH acids, wherein R comprises $C_5$-$C_{22}$ carbon chains. "Metal soap" type organic coatings are recommended, as the most effective coatings for this application. In one of the examples shown in the patent, a hydrophilic $SiO_2$ grade in micron size range was used in combination with an organic lubricating agent.

What is needed in the industry is a manner of improving the flow properties of particulate sorbitol acetals without the use of undesirable pre-blends, solvents, organic lubricants, and the like. A method and composition that can be applied without the addition of cumbersome and costly mechanical equipment would be desirable. A composition or method of deploying into polymers particulate sorbitol acetal compounds in a manner to result in smooth and uninterrupted flow from hoppers would be highly desirable. A manner of achieving high quality, low haze, polymeric parts that are substantially free of blemishes or undesirable specks would be highly desirable. The invention relates to improved flow of sorbitol acetal compounds, and is further described below.

BRIEF DESCRIPTION OF THE DRAWINGS

FIGS. 2-9 below illustrate various aspects of the invention, while FIG. 1 shows commercially known product.

FIG. 1 is a photomicrograph showing crystals of commercially known DMDBS clarifier (Millad 3988 brand clarifying agent) of a DMDBS crystal size (length) of about 3-9 µm, such as DMDBS crystal particle 9;

FIG. 2 shows DMDBS combined with micron size range silica, in which the silica forms aggregates 16 that often are significantly larger than the DMDBS crystal particles 14;

FIG. 3 depicts a photomicrograph of one embodiment of the invention of a DMDBS with submicron size silica, in which the submicron size silica particles are significantly smaller than the DMDBS particle 18, and therefore provide advantageous properties and serve as a flow aid to the blended DMDBS/silica additive composition;

FIG. 4 is a photomicrograph showing a DMDBS particle 18 of FIG. 3 which compares schematically the size and configuration of DMDBS particle 18 to clusters of submicron size silica particles 22, in which submicron size silica particles agglomerate to form clusters 20a-c, as shown in the FIG. 4;

FIG. 5 is a graph showing cohesive strength values for Examples 1-1 through 1-5, a loading level comparison for micron size range silica, including a comparative DMDBS without silica, as further described herein;

FIG. 6 is a graph showing cohesive strength values for Examples 2-1 to 2-2; a comparison of hydrophobic to hydrophilic silica for micron size range silica, and as further described herein;

FIG. 7 is a graph showing cohesive strength values for Examples 2-1, 2-2, 3-1 and 3-2, comparing submicron size, micron size, hydrophobic, and hydrophilic silica, as further described herein; and FIG. 8 is a graph showing cohesive strength values for Examples 4-1 through 4-5 as further described herein; and FIG. 9 is a graph showing cohesive strength values for Examples 5-1 and 5-2, which includes data on the efficacy of the invention as applied to MDBS (bis(p-methylbenzylidene) sorbitol).

DETAILED DESCRIPTION OF THE INVENTION

Reference now will be made to the embodiments of the invention, one or more examples of which are set forth below. Each example is provided by way of explanation of the invention, and not as a limitation of the invention.

It has been discovered that submicron size range silica compounds having a reduced particle size may provide excellent flow enhancement properties when blended and used with sorbitol acetal powder compounds.

Further, it has been discovered that in many instances a hydrophobic silica mixed with sorbitol acetal compounds provides enhanced flow properties for such mixture, as compared to mixtures using hydrophilic silica (i.e. $SiO_2$). In general, and especially for micron size ranges, hydrophobic silica improves sorbitol acetal flow more than hydrophilic silica.

It has been discovered as well that in some instances micron size silica unexpectedly improves the flow properties of sorbitol acetal powder when the silica dosage as a percent of the overall additive composition is higher than about 10 wt %. This is desirable, and unexpected, in part because some silica manufacturers recommend using less than about two (2) weight percent silica for the purpose of assisting in powder flow. See for example an internet address for a manufacturer: www.gracedavison.com/Products/Pharmpc2.htm, which recommends using about 0.25% to about 1.0% of a hydrophilic silica, Syloid 224 FP®. The discovery in the course of the invention of this application that substantial benefits may occur above ten (10) weight percent silica (which is more than five times greater than some of the industry recommendations) is significant and unexpected.

In the practice of the invention, silica is capable of providing flow enhancement benefits in most instances without using organic lubricating materials. Submicron sized silica desirably provides an optical reflective index relatively close to that of polyolefins, and this has been found to be very desirable in providing suitable haze values for finished polymeric articles. Thus, use of submicron sized silica in sorbitol acetal compounds minimizes the amount of undesirable adverse effects upon the optical performance (i.e. haze levels) when applied in a polymer or polymeric article of manufacture.

Some types of silica significantly improve the flow properties of sorbitol acetal compounds under appropriate conditions. The appropriate conditions may include one or more of the following: (1) sufficient loading (higher than conventional dosage of silica as a flow aid), and (2) chemical nature of the silica surface (hydrophobic silica usually is better than hydrophilic silica), and (3) an appropriate particle size range (submicron particle size silica). One or more of these factors may be employed for improved flow.

The invention provides different additive compositions comprising a sorbitol acetal compound and a silica having at least one of the following properties:

The silica may be hydrophobic, as defined further below (property A).

The silica may be a submicron-sized silica component, as defined further below (property B).

The silica may be a silica component, wherein said silica component contains a silica fraction providing at least 1% by weight of said additive composition of silica particles, said 1% silica fraction having particles with an actual particle size of less than 1 μm (property C).

The silica may be a silica component, wherein said silica component has an Mv value of less than about 20 μm and a D90 value of less than about 50 μm, and wherein the weight percentage of said silica in the additive composition is equal or greater than about 10% (property D).

The silica may have only one of these properties or properties A and B; A and C; A and D; A, B and C; A, B and D; B and C; B, C, and D; B and D; C and D; or A, B, C and D in combination. Moreover, each of the respective additive compositions may be substantially free of organic lubricating agents.

Submicron Sized Silica Component.

An additive composition may be provided in another aspect of the invention comprising a sorbitol acetal compound and a silica component, said silica component having a volume mean diameter (Mv) value of less than about 0.6 μm and a D90 value of less than about 1 μm.

"D90 value" means that the silica fraction of the additive composition in this particular embodiment of the invention is such that ninety (90) % (vol. %) of the actual silica particles are less than about 1 μm in diameter. In another embodiments of the invention, a Mv value of less than about 0.4 μm and a D90 value of less than about 0.6 μm is provided. In a further embodiment, the Mv value is in the range of 0.1 to 0.3 μm and the D90 value is in the range of 0.3 to 0.5 μm. In other embodiments, the weight percentage of the silica in the additive composition is from about 0.5% to about 30%, or from about 0.5% to about 10%, or alternatively from about 1% to about 5%. A polymeric or copolymeric article of manufacture comprising such compositions also may be realized in the practice of the invention.

Threshold Minimum Amount of Silica in the Submicron Size Range.

In yet another aspect of the invention, a blend of a sorbitol acetal compound and silica is disclosed. The silica in this particular embodiment may have several fractions, based upon particle size. However, at least one fraction of the silica provides greater than 1% by weight of the total additive composition and also exhibits an actual particle size (Mv) of less than 1 μm. That is, it has been found that if at least 1% by weight of the total additive composition (i.e. DBS/silica) comprises silica having a size of less than 1 μm, the blend provides unexpectedly superior flow properties. Furthermore, in some embodiments of the invention, such an additive composition also may provide a D10 value of less than about 0.5 μm; meaning that 10% of the silica particles are less than about 0.5 μm in diameter. This silica may be hydrophobic, in one embodiment. The weight percentage of silica in the additive composition further may be between about 0.5% and 30%, or alternatively between 0.5% and 10%. A polymeric article made using such additive composition is also desirable.

Relatively Higher Silica Loadings

In yet another embodiment of the invention, an additive composition is provided in which the composition comprises a sorbitol acetal compound and a silica component, in which the silica component has a size range Mv value of less than about 20 μm and a D90 value of less than about 50 μm; further wherein the weight percentage of the silica in the overall total additive composition is equal to or greater than about 10%. The silica component further may provide a Mv value of less than about 10 μm, and a D90 value of less than about 25 μm, in one embodiment of the invention. The weight percentage of silica in the additive composition may be between about 10% and 30% in yet another embodiment. The silica also may be hydrophobic, as one option, and polymeric articles may be manufactured using such a composition.

In one embodiment, the invention provides a sorbitol acetal/silica additive composition that is substantially free of organic lubricating agents, such as metal soaps of stearic acid and the like. That is, it is possible to achieve unexpected and superior flow enhancement in sorbitol acetal compositions, in most instances, without the use of organic lubricants and/or metal soaps, or pre-blends.

In the practice of the invention, a method of employing any of the compositions disclosed herein in the manufacture of a polyolefin, polymer, or copolymer is also contemplated.

Shaped articles, molded articles, and the like may be made using such additive compositions.

Powder Flowability

One definition of powder flowability is the ability of a powder to flow. Powder flowability is usually described by several measurable flow properties, including cohesive strength, internal friction, wall friction, shear strength, tensile strength, bulk density, and permeability. Cohesive strength is one of the most important and parameters employed to describe the powder flowability. Powders with poor flow properties may develop certain flow problems, such as "bridging", "rat-holing", and "flooding", in hopper feeding equipment.

Silica

Silica is naturally occurring silicon dioxide ($SiO_2$) in various crystalline and amorphous forms. Silica also may be chemically synthesized. Based on the different processes employed to synthesize silica, several types of silica are commercially available, and may be employed, depending upon the particular embodiment to be achieved:

(1) fumed silica, which is manufactured in a gas phase pyrogenic process by reacting silicon tetrachloride in an oxyhydrogen flame above 1000° C. to offer exceptional purity;

(2) precipitated silica, which is produced in a wet process by acidification of sodium silicate solution under conditions that usually do not lead to a gel; and (3) silica gel, which is produced by acidification of sodium silicate solution under conditions to lead to gel formation and to provide a porous structure after drying.

The average primary particle size of fumed silica ranges from about 5 nm to about 50 nm, and the primary fumed silica particles form tightly fused structure aggregates in the size range of 100 nm to 1 µm. On the other hand, mean particle size of precipitated silica ranges from 4 µm to about 15 µm, whereas that of silica gel, including the special form named called "aerogel," can be about 4 µm and above.

Hydrophilic and Hydrophobic Silicas

Based upon the chemical nature after surface treatment, silica is distinguished into two types in the industry: hydrophilic and hydrophobic, regardless of the silica particle size. Hydrophilic silica generally refers to the type without surface treatment after chemical synthesis and exhibits an affinity for water due to the presence of the surface silanol groups. Hydrophilic silica may be wetted with water. Without surface treatment, synthetic amorphous silica is naturally hydrophilic. Silica sold in the industry is typically identified clearly by the manufacturer whether it is hydrophilic or hydrophobic silica.

Hydrophobic materials are water repellant. In general, hydrophobic materials do not absorb significant quantities of water (i.e. less than about 1.5%) and do not wet readily with water. A simple wetting test with water is commonly used to determine if a sample is hydrophobic. Hydrophobic silica is chemically modified, and it may be determined by FTIR analysis.

Commercial grades of hydrophilic silica include Aerosil® and Sipernat® product lines from Degussa AG and Cab-o-sil® product line from Cabot. Hydrophobic silica refers to the type of silica whose surface is chemically modified by reacting the surface silanol groups with various silanes, silazanes, and siloxanes. Hydrophobic silica usually cannot be wetted with water. Commercial grades of hydrophobic silica include Aerosil® product line "R" series and Sipernat® product line "D" series from Degussa AG and Cab-o-sil® product line "TG" series and Nanogel® product line from Cabot.

In one aspect of the invention, the additive composition comprises a sorbitol acetal compound and a hydrophobic silica. The loading of silica in such an additive composition may in some instances be in the range of from about 0.5% to about 30%, or from about 0.5% to about 10%, and sometimes from about 1% to about 5%. A polymeric or copolymeric article may be manufactured using the additive composition.

The differentiation between hydrophilic silica and hydrophobic silica can be effectively achieved by measuring different parameters such as moisture vapor adsorption isotherm, contact angle, wettability, carbon content, or infrared spectroscopy, to name a few.

Silica Geometry

Synthetic amorphous silica typically exists as a finely divided white powder. This powder consists of individual particles with irregular shapes and dimensions. In the dry state silica powders are found to be loose agglomerates of particles. Wetting the powder with a wetting agent, and applying dispersion energy, facilitates the microscopic evaluation of the de-agglomerated silica particles. These particles vary in size. Statistical methods must be employed to quantitatively describe the population.

Further examination of the silica powder using electron microscopy reveals that the particles are comprised of primary particles that are fused or tightly bound. The primary synthetic amorphous silica particle tends to be spherical in shape and varies in size from about 5 to 500 nm depending upon the manufacturing process used to prepare the powder. Clusters of these primary particles form the individual particles or aggregates. Thus the silica powder consists of loose agglomerates of aggregates of primary particles. Weak electrostatic charges as well as mechanical forces hold the agglomerate together. For the purpose of analysis it is useful to disperse the powder in a liquid by stirring and applying ultrasonic energy. This will produce a liquid dispersion that is stable in size and suitable for analysis.

Various types of silica can be employed in this invention. The examples and tables herein list several types of silica that can be used in the practice of this invention. The practice and scope of the invention, however, is not limited to only those types recited herein.

Table 1 herein lists the silica grades that have been employed in the examples of the invention and their particle size parameters. For purposes of this specification and claims made herein, measurements of submicron particles are measured by dynamic light scattering, and measurements of micron-size particles (greater than about 1 um) are measured by laser diffraction, as indicated in Table 1. Aerosile 300, Aerosil® R812, Aerosil® 150, and Aerosil® R972 are fumed silica from Degussa AG. HDK H15 is a fumed hydrophobic silica from Wacker-Chemie GmbH. Sipemat® D13 and Sipernat® 22LS are precipitated silica from Degussa AG. Syloid® 244 is a hydrophilic silica gel from Grace Davison. However, these silica grades are merely examples of the silica that can be employed, and the invention is not limited to any particular manufacturer or type, or grade of silica.

Particle Size Analysis

Optical microscopy is a fundamental technique for particle size analysis. If a single particle is viewed at 500×, it is possible to estimate the diameter down to about 0.8 µm by comparison to a calibrated grid. Observations may also be made about the shape of the particles and whether they are transparent, absorbent, or reflective. These preliminary observations are useful for the selection of an instrument to accurately measure the entire population of particles in a powder sample.

Ultrasonic wet sieving involves the use of electroformed precision sieves with openings as small as 5 µm. Typically, a 1-gram sample of the powder is wetted with approximately 1 liter of dispersant fluid and the suspension is filtered slowly through the vibrating sieve. Over-sized particles, which are too large to pass through the sieve, are dried and weighed so that a percentage value for the over-sized population may be calculated. Ultrasonic wet sieving is a technique to measure coarse end of a fine particle distribution, but like optical microscopy, it is not a practical method to measure the entire distribution so that an average or mean particle size may be known. However, both microscopy and sieving are useful preliminary methods to determine the size range of a powder sample so an appropriate method can be selected.

Laser Diffraction

Laser diffraction is a common technique used to measure the size distribution of a powder. A sample is dispersed in a liquid and passed through a clear cell where it is illuminated by a laser. The scattering pattern from the laser is detected by a light sensitive photodiode array. The scatter pattern is related to the size distribution of the particles exposed to the laser beam in that small particles scatter monochromatic light at large angles and large particles scatter at small angles. This phenomenon is referred to as Fraunhofer diffraction and is the theoretical basis for commercial laser diffraction instruments.

The detection range for laser diffraction instruments is as wide as 1 to 2000 µm. Some instruments also use Mie theory to compensate for errors with small particles to extend the lower detection range from 1 to 0.1 µm. Laser diffraction instruments measure a volume based particle size distribution. For irregular shaped particles the diameters reported are equivalent spherical diameters.

Data from a laser diffraction instrument is often presented as a histogram and the following statistical parameters are calculated to describe the size distribution of the powder.

Volume Mean Diameter (Mv)—Volume weighted arithmetic average particle diameter (also known as the volume moment diameter or the D (4, 3).

Tenth Percentile (D10)—Particle diameter corresponding to 10% of the cumulative volume based distribution.

Fiftieth Percentile (D50)—Particle diameter corresponding to 50% of the cumulative volume based distribution.

Ninetieth Percentile (D90)—Particle diameter corresponding to 90% of the cumulative volume based distribution.

Dynamic Light Scattering

Dynamic light scattering is another popular method used to measure the size distribution of fine particles. The technique uses a diode laser to illuminate particles in a suspension to develop optical frequency shift information to measure particles that range in size from 0.001 to 6 µm. Particles in suspension are in constant random motion (Brownian motion) as a result of interactions and collisions with molecules of the suspending fluid. In the Stokes-Einstein theory of Brownian motion, particle motion is determined by the suspending fluid viscosity. From a measurement of the particle motion in a fluid of known temperature and viscosity, the particle size can be determined. Dynamic light scattering uses optical methods to measure particle motion. Small particles have a high velocity and cause a large frequency shift whereas large particles move more slowly and cause small frequency shifts in the illuminating light source. Random particle motion, measured over time, may be illuminated by a laser and used to form a distribution of optical frequency shifts that can be used to calculate the size distribution of the powder.

The size distribution measured with dynamic light scattering is volume based. It is common to use statistical values such as the mean (Mv), tenth percentile (D10), fiftieth percentile (D50), and ninetieth percentile (D90) to describe the particle size distribution. Dynamic light scattering is superior to laser diffraction for the measurement of powders with a size range predominately below 1 µm. Laser diffraction is a preferred method to analyze powders that contain particles greater than about 6 µm in size.

Analytical Methods

Both laser diffraction and dynamic light scattering techniques require that the powder be de-agglomerated and dispersed in a fluid. Through experimentation it has been determined that isopropyl alcohol (IPA) is a suitable wetting agent for both hydrophilic and hydrophobic synthetic amorphous silica. The powder is first wetted with IPA by stirring and then is dispersed with ultrasonic energy. Physical properties for IPA and silica are listed below.

IPA Refractive Index—1.38
IPA Viscosity@15 C—2.86 cp
IPA Viscosity@30 C—1.77 cp
Silica Refractive Index—1.46
Silica Particle Shape—Non-spherical
Silica Particle Opacity—Transparent More specifically, 0.75 to 1 gram of powder is added to 30 ml of filtered IPA in a 50 ml-glass beaker. The suspension is stirred with a spatula until the silica powder is wetted by the IPA. The beaker is sonicated using a ⅜" diameter, 750-watt ultrasonic probe for 3 minutes at a 5% power setting. Optical microscopy and ultrasonic wet sieving are used to evaluate the quality of dispersion and estimate the size range of the particles in the population for each sample of silica powder.

Dynamic light scattering is a suitable method to measure submicron silica powders herein. The Nanotrac 150 manufactured by Microtrac, Inc. is a commercially available dynamic light scattering device with a detection range of 0.0008 to 6.5 µm. A sample of the silica dispersed in IPA is added to the Nanotrac 150 sample cell and a measurement is made in duplicate over a 200 second time interval. The particle size distribution is calculated with a computer using Microtrac Flex software version 10.3.0.

Laser diffraction is used herein for measurements provided in this specification and claims which are above about 1 um, and laser diffraction is generally useful for a detection range of about 0.1 to 2000 µm. Silica powders with a significant fraction of the size population greater than 6 µm are beyond the upper detection range of dynamic light scattering whereas they can readily be analyzed by laser diffraction. The Microtrac S3500 is a commercially available laser diffraction instrument manufactured by Microtrac, Inc. The instrument uses a three-laser system and an external sample circulation system to generate a volume based size distribution. Silica powders are analyzed by first dispersing them in IPA using an ultrasonic probe then transferring a representative sample of the dispersion to the sample circulation system which contains IPA. The dilute suspension circulates through a sample cell where the particles are illuminated by laser light. The diffraction pattern over three 30-second time intervals is recorded and the size distribution is calculated by a computer using Microtrac Flex software version 10.3.0.

In addition to the normal volume based statistical parameters, a number based mean particle size (Mn) is calculated and recorded. The Mn gives a greater weight to the smaller particles in the distribution and is shown with the volume based mean particle size for comparative purposes.

TABLE 1

Samples of Silica Employed in the Invention

| Sample ID | Silica Type | Analytical Method | D10 μm | D50 μm | D90 μm | Mv μm | Mn μm |
|---|---|---|---|---|---|---|---|
| Aerosil 300 | Fumed Hydrophilic | Dynamic Light Scattering | 0.082 | 0.183 | 0.346 | 0.21 | 0.15 |
| Aerosil R812 | Fumed Hydrophobic | Dynamic Light Scattering | 0.05 | 0.17 | 0.46 | 0.24 | 0.13 |
| Aerosil 150 | Fumed Hydrophilic | Dynamic Light Scattering | 0.11 | 0.22 | 0.43 | 0.26 | 0.20 |
| Aerosil R972 | Fumed Hydrophobic | Dynamic Light Scattering | 0.13 | 0.25 | 0.49 | 0.29 | 0.22 |
| HDK H15 | Fumed Hydrophobic | Dynamic Light Scattering | 0.13 | 0.24 | 0.46 | 0.30 | 0.22 |
| Sipernat D13 | Precipitated Hydrophobic | Laser Diffraction | 5.0 | 10.8 | 22.4 | 12.7 | 9.0 |
| Syloid 244 | Gel Hydrophilic | Laser Diffraction | 5.4 | 9.9 | 17.1 | 10.8 | 8.8 |
| Sipernat 22LS | Precipitated Hydrophilic | Laser Diffraction | 3.6 | 8.4 | 21.5 | 13.8 | 6.8 |

Diacetals of Sorbitol (Sorbitol Acetal Compounds)

Clarifying agents of interest for use with the particular silica described herein include diacetals of sorbitols and xylitols having the general formula

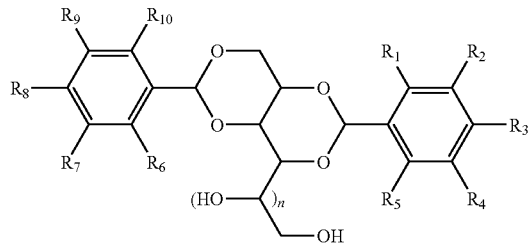

(I)

where $R_1$, $R_2$, $R_3$, $R_4$, $R_5$, $R_6$, $R_7$, $R_8$, $R_9$, $R_{10}$ are the same or different and each represents a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, or a 4 or 5 membered alkyl group forming a carbocyclic ring with adjacent carbon atoms of the unsaturated parent ring; n represents 0 or 1. Of particular interest are clarifying agents where n is 1 and $R_1$, $R_2$, $R_3$, $R_4$, $R_5$, $R_6$, $R_7$, $R_8$, $R_9$, $R_{10}$ are selected from $C_{1-4}$ alkyl, chlorine, bromine, thioether and a 4-membered alkyl group forming a carbocyclic ring with adjacent carbon atoms of the unsaturated parent ring. Examples of specific clarifiers include: dibenzylidene sorbitol, bis(p-methylbenzylidene) sorbitol, bis(o-methylbenzylidene) sorbitol, bis(p-ethylbenzylidene) sorbitol, bis (3,4-dimethylbenzylidene) sorbitol, bis(3,4-diethylbenzylidene) sorbitol, bis(5',6',7',8'-tetrahydro-2-naphthylidene) sorbitol, bis(trimethylbenzylidene) xylitol, and bis(trimethylbenzylidene) sorbitol.

Also within the scope of the present invention are compounds made with a mixture of aldehydes, including substituted and unsubstituted benzaldehydes, and the like.

The clarifying agents of interest also include diacetals of sorbitols and xylitols having a non-hydrogen substituted on the first carbon (i.e. $C_1$) of the sorbitol chain, as shown in the general formula (II):

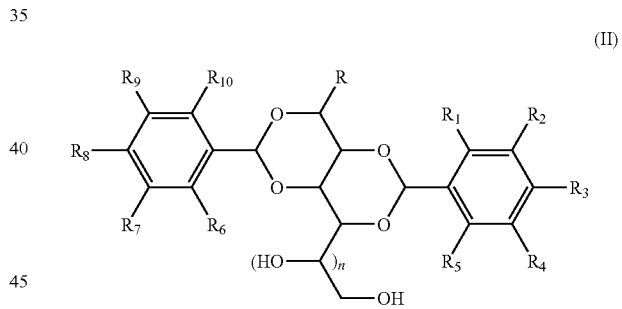

(II)

where R may be selected from the group consisting of: alkenyls, alkyls, alkoxys, hydroxyl alkyls, and haloalkyls, and derivatives thereof; $R_1$, $R_2$, $R_3$, $R_4$, $R_5$, $R_6$, $R_7$, $R_8$, $R_9$, $R_{10}$ are the same or different and each represents a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, or a 4 or 5 membered alkyl group forming a carbocyclic ring with adjacent carbon atoms of the unsaturated parent ring; and n represents 0 or 1.

Of particular interest are clarifiers where R is methyl, ethyl, propyl, butyl, allyl, or crotyl, $R_1$, $R_2$, $R_3$, $R_4$, $R_5$, $R_6$, $R_7$, $R_8$, $R_9$, $R_{10}$ are selected from $C_{1-4}$ alkyl, chlorine, bromine, thioether and a 4-membered alkyl group forming a carbocyclic ring with adjacent carbon atoms of the unsaturated parent ring.

Examples of specific clarifiers that may be mixed with silica and employed in the practice of the invention include:

1,3:2,4-bis(4-ethylbenzylidene)-1-allyl-sorbitol, 1,3:2,4-bis(3'-methyl-4'-fluoro-benzylidene)-1-propyl-sorbitol, 1,3:2,4-bis(5',6',7',8'-tetrahydro-2-naphthaldehydebenzylidene)-1-allyl-xylitol, bis-1,3:2-4-(3',4'-dimethylbenzylidene)-1-methyl-sorbitol, and 1,3:2,4-bis(3',4'-dimethylbenzylidene)-1-propyl-xylitol.

One sorbitol acetal clarifier that may be employed is Millad® 3988, which is manufactured and distributed by Milliken & Company of Spartanburg, S.C. Its chemical identity is 1,3:2,4-bis(3,4-dimethylbenzylidene sorbitol), and it is known as "DMDBS". Millad® 3988 used in this specification is the commercial grade, which is manufactured with a step of milling through an air-jet mill to afford the ultra fine particle size of particles (d97 of 30 microns or less, and a mean particle size of 15 microns or less) that is useful to achieve its full clarifying power.

One surprising finding in the invention is that there is a "fit" or synergy between silica particle and the primary sorbitol acetal particle, which is unexpected.

A second example, Millad® 3940, is manufactured and distributed by Milliken & Company of Spartanburg, S.C. Its chemical identity is 1,3:2,4-bis(4-methylbenzylidene sorbitol), and it is sometimes known as MDBS. Millad® 3940 used in this specification is the commercial grade. The practice and scope of this invention, however, is not limited to these two examples.

Thermoplastic Polymers and Copolymers

Polyolefins are widely used in article applications including housewares containers, bottles, cups, syringes, pipes, films, and the like through various processing methods such as injection molding, extrusion blow molding, thermoforming, and casting. In many applications, transparency or clarity of such plastic parts is desired. Clarifiers such as Millad® 3988 are used in these applications to provide to the plastic articles desired optical properties. Typical polymers using clarifying or nucleating agents are polypropylene homopolymer (HPP), polypropylene random copolymer (RCP), polypropylene impact copolymer (ICP). Millad® 3988 also clarifies some polyethylene resins, like linear low density polyethylene (LLDPE), low density polyethylene (LDPE), and high density polyethylene (HDPE).

The polyolefin employed in the examples herein is Profax SA849, which is a spheripol polypropylene random copolymer with approximate 12 MFR (g/10 min). The practice and scope of the invention, however, is not limited to SA849 RCP, or even to any particular polymer or polyolefin. Many other polyolefin grades could be successfully employed in the practice of the invention.

Flowability Measurement

To quantify the effect of silica in reducing the cohesive strength of DMDBS, and thereby improving the powder's flowability, Jenike-Schulze ring shear tests were performed to determine the cohesive strength of the following examples according to ASTM standard D6773-O$_2$. Data shown in the tables and Figures related to the examples indicate the relationship between the cohesive strength of the powders as a function of consolidating pressure. Typically, as a powder is compressed, its cohesive strength increases. Flowability improvement on a given powder formulation is demonstrated by a lower line in the graph compared with the control comparative (see FIGS. 5-9).

Comparative Example

100% DMDBS is used as the comparative example for all sets of examples. Its cohesive strength data is listed in following tables. This example is made by stirring DMDBS (50 g) at ambient temperature for 20 seconds using a consumer grade food processor that has a bowl with a diameter of 11 cm and a height of 10 cm. The food chopper has a sharp S-shaped blade with a diameter of 10 cm and rotates at about 1500 rpm when running.

Hydrophilic Silica Blends: Loading Levels of Silica Using Micron Sized Silica

Examples 1-1 to 1-5

Table 2 and FIG. 5 illustrate the cohesive strength data of formulations containing DMDBS and hydrophilic micron sized silica Syloid® 244 (Mv=10.8)(micron sized silica range) at a constant total mass of 50 g and various ratios between them. Each formulation is mixed at ambient temperature for 20 seconds using a consumer grade food processor that has a bowl with a diameter of 11 cm and a height of 10 cm.

TABLE 2

Cohesive strength data of hydrophilic powder formulations of DMDBS and Syloid ® 244 (hydrophilic, micron size)

| Examples | DMDBS/ Syloid ® 244 (wt %) | Consolidating pressure 1 (psf)/ Cohesive strength 1 (psf) | Consolidating pressure 2 (psf)/ Cohesive strength 2 (psf) |
|---|---|---|---|
| Comparative | 100/0 | 46/30 | 86/60 |
| 1-1 | 95/5 | 43/30 | 84/59 |
| 1-2 | 90/10 | 46/31 | 81/50 |
| 1-3 | 85/15 | 43/28 | 78/47 |
| 1-4 | 80/20 | 42/26 | 80/48 |
| 1-5 | 70/30 | 42/29 | 78/48 |

Comparison may be observed between the cohesive strength of various DMDBS/silica blends for micron sized silica. It may be seen in Table 2 that cohesive strength decreases significantly when more than about 10 weight percent of such silica is employed, which is highly desirable. Cohesive strength decrease corresponds to an increase in flowability of the additive composition.

Examples 1-2, 1-3, 1-4 and 1-5 show that for micron sized silica, weight ratios of between about 10 and about 30 weight percent perform particularly well, having reduced cohesive strength, and therefore improved flow properties. Thus, this example illustrates that loading levels in the range of about 10-30% are quite useful. A loading level of between about 10 and about 20 percent performed very well, as shown by the lowermost lines in FIG. 5 (examples 1-3 and 1-4).

Hydrophobic Versus Hydrophilic Silica: Effects when Using Micron Sized Silica

Examples 2-1 and 2-2

Table 3 and FIG. 6 illustrate the cohesive strength data of formulations containing DMDBS and various grades of micron size silica at a constant total mass of 50 g and a constant ratio of 97:3 between DMDBS and the corresponding silica grade. Each formulation is mixed at ambient temperature for 20 seconds using a consumer grade food processor that has a bowl with a diameter of 11 cm and a height of 10 cm.

The data generated and displayed in Table 3 shows that for this given silica loading (3 percent), a hydrophobic silica results in a lower cohesive strength value (better flowability) than hydrophilic silica (compare 26 to 29, and 48 to 54, below). This is seen graphically in FIG. 6, wherein the lowermost line on the graph represents the hydrophobic example, 2-1.

TABLE 3

Cohesive strength data of powder formulations of DMDBS and hydrophobic or hydrophilic micron size silica grades

| Examples | Micron size silica | Consolidating pressure 1 (psf)/ Cohesive strength 1 (psf) | Consolidating pressure 2 (psf)/ Cohesive strength 2 (psf) |
| --- | --- | --- | --- |
| Comparative | — | 46/30 | 86/60 |
| 2-1 | Sipernat ® D13 (hydrophobic, micron size) | 40/26 | 75/48 |
| 2-2 | Sipernat ® 22LS (hydrophilic, micron size) | 42/29 | 80/54 |

Hydrophilic Versus Hydrophobic: Effects at Submicron and Micron Size Ranges

Examples 3-1 and 3-2

Table 4 and FIG. 7 illustrate the cohesive strength data of formulations containing DMDBS and various grades of submicron and micron size silica at a constant total mass of 50 g and a constant ratio of 97:3 between DMDBS and the corresponding silica grade. Each formulation is mixed at ambient temperature for 20 seconds using a consumer grade food processor that has a bowl with a diameter of 11 cm and a height of 10 cm. The two formulations (Examples 2-1 and 2-2) containing DMDBS and micron size silica grades are also included here for comparison.

TABLE 4

Cohesive strength data of powder formulations of DMDBS and submicron size or micron size silica grades

| Examples | Silica grades | Consolidating pressure 1 (psf)/ Cohesive strength 1 (psf) | Consolidating pressure 2 (psf)/ Cohesive strength 2 (psf) |
| --- | --- | --- | --- |
| Comparative | — | 46/30 | 86/60 |
| 3-1 | Aerosil ® R972 (hydrophobic, submicron size) | 39/23 | 78/44 |
| 3-2 | Aerosil ® 300 (hydrophilic, submicron size) | 41/24 | 74/41 |
| 2-1 | Sipernat ® D13 (hydrophobic, micron size) | 40/26 | 75/48 |
| 2-2 | Sipernat ® 22LS (hydrophilic, micron size) | 42/29 | 80/54 |

The data above shows that submicron size range silica generally outperforms micron size silica. Examples 3-1 and 3-2, as seen in FIG. 7, provide the lowest cohesive strength, and therefore the greatest flowability of the additive composition.

Furthermore, for micron sizes (i.e. 2-1 and 2-2), hydrophobic silica (2-1) outperformed hydrophilic silica (2-2), as shown in the top portion of FIG. 7.

Comparisons of Loading Level for Hydrophobic Submicron Size Silica Particles

Examples 4-1 to 4-5

Examples 4-1 to 4-5 (See FIG. 8) are designed for a trial at a larger pilot scale to evaluate the feasibility of the application of the invention, and to compare loading levels of silica for submicron size silica particles in the blend.

Table 5 and FIG. 8 illustrate cohesive strength data of formulations containing DMDBS and hydrophobic submicron size silica Aerosil® R972 (a fumed hydrophobic, submicron size silica) at a constant total mass of 10 kg and five different ratios between them. Each formulation has been mixed at ambient temperature for 30 seconds using a Lodige Model FKM 130 batch mixer equipped with Becker shovels and high speed choppers.

TABLE 5

Cohesive strength data of powder formulations of DMDBS and Aerosil ® R972 (hydrophobic, submicron size) from pilot scale blender

| Examples | DMDBS/ Aerosil ® R972 (wt %) | Consolidating pressure 1 (psf)/ Cohesive strength 1 (psf) | Consolidating pressure 2 (psf)/ Cohesive strength 2 (psf) |
| --- | --- | --- | --- |
| Comparative | 100/0 | 46/30 | 86/60 |
| 4-1 | 99/1 | 44/30 | 82/54 |
| 4-2 | 98/2 | 40/25 | 73/41 |
| 4-3 | 97/3 | 39/23 | 74/45 |
| 4-4 | 96/4 | 38/21 | 75/49 |
| 4-5 | 95/5 | 37/20 | 72/43 |

The loading levels employed were between 1% and 5%. Results indicate that the 5% loading level was superior, and in general, as loading levels increased from 1 to 5 percent, the cohesive strength tended to decrease (which correlates to improves results, that is, improved amount of flowability). FIG. 8 shows that the improved results (i.e. lower line) of greater flowability (lower cohesive strength) is apparent at about 5% loading for this example of submicron size range silica.

MDBS Based Nucleating Agent

Examples 5-1 and 5-2

Examples 5-1 to 5-2 employ MDBS bis(p-methylbenzylidene) sorbitol, sold by Milliken & Company as Millad® 3940 brand nucleating agent (which is also known as "MDBS"). Other sorbitol acetal compounds could be employed equally well in the practice of the invention, and the invention is applicable for essentially any sorbitol acetal compound.

Table 6 and FIG. 9 illustrate the cohesive strength data of formulations containing MDBS and hydrophobic submicron size silica Aerosil® R972 at a constant total mass of 50 g at two different ratios. Each formulation is mixed at ambient temperature for 20 seconds using a consumer grade food processor that has a bowl with a diameter of 11 cm and a height of 10 cm.

The results indicate that 3% silica improved substantially the cohesive properties of the MDBS/silica blend, reducing cohesive strength, and thereby improving flowability.

TABLE 6

Cohesive strength data of powder formulations of MDBS and Aerosil® R972 (hydrophobic, submicron size)

| Examples | MDBS/Aerosil® R972 (wt %) | Consolidating pressure 1 (psf)/ Cohesive strength 1 (psf) | Consolidating pressure 2 (psf)/ Cohesive strength 2 (psf) |
|---|---|---|---|
| 5-1 | 100/0 | 51/45 | 92/70 |
| 5-2 | 97/3 | 46/36 | 93/66 |

Haze Measurements

Examples 6-1 and 6-15

To examine whether the incorporation of silica into DMDBS powder would have negative impact on the haze of polymeric articles made using such a blend, several formulations containing DMDBS and various silica grades at different ratios were tested for their clarifying function in a grade of polypropylene random copolymer (as shown in Table 7). The results below indicate that haze levels for silica samples are less than the control sample which did not use silica (i.e. example 6-1, which shows no undesirable effects upon haze by use of the silica grades indicated.

Standard processing condition comprises the following steps:
a) each polymer composition is composed of polypropylene random copolymer flakes (12 MFR) 1000 g, Irganox® 1010 (primary antioxidant, available from Ciba) 0.5 g (500 ppm), Irgafos® 168 (secondary antioxidant, available from Ciba) 1 g (1000 ppm), calcium stearate (acid scavenger) 0.8 g (800 ppm), DMDBS 2 g (2000 ppm), and silica at various loadings (see Table 7 for silica's grades and use levels);
b) mixing all components in a high intensity mixer at ambient temperature for 1 minute;
c) compounding the mixture using a single screw extruder at ca. 230° C.;
d) molding the compounded resin into 2×3×0.05 inch plaques at ca. 230° C. melt temperature; e) at least 12 plaques being collected for haze reading according to ASTM D1003-92 using a haze meter BYK Gardner haze-gard plus; and
f) sample plaques are submitted for detection of white specks under an Olympus BX51 upright optical microscope.

TABLE 7

Optical performance of polypropylene formulations containing 2000 ppm DMDBS versus silica grade and loading

| Examples | Silica | Loading (ppm) | Haze (%) | White speck (Y/N) |
|---|---|---|---|---|
| 6-1 | — | — | 8.5 | N |
| 6-2 | Aerosil® 300 | 60 | 8.0 | N |
| 6-3 | (hydrophilic) | 100 | 8.0 | N |
| 6-4 | | 200 | 8.1 | N |
| 6-5 | | 300 | 8.1 | N |
| 6-6 | | 400 | 8.1 | N |
| 6-7 | | 500 | 8.1 | N |
| 6-8 | | 600 | 8.2 | N |
| 6-9 | HDK® H15 | 60 | 8.1 | N |
| 6-10 | (hydrophobic) | 100 | 7.9 | N |
| 6-11 | | 200 | 8.0 | N |
| 6-12 | | 300 | 8.0 | N |
| 6-13 | | 400 | 7.9 | N |
| 6-14 | | 500 | 7.8 | N |
| 6-15 | | 600 | 8.0 | N |

Technical Conclusions

There are at least three independent key factors that dominate the flowability improvement potential of silica for sorbitol acetal compounds. The inventions identified herein correspond in some cases to the discoveries relating to such factors.

Important factors in flowability performance of silica/sorbitol acetal compound additive compositions are:
1) loading (weight percent) of silica in the additive compositions;
2) hydrophobicity of silica employed; and
3) particle size of silica particles employed in the additive compositions.

Loading

As shown in Table 2 and FIG. 5, Syloid® 244 does not improve the flow properties of DMDBS powder additive blends until its dosage is higher than about 10 wt % of the overall additive composition formulation. This is rather unexpected, given that manufacturers of silica in the industry recommend about 2% silica when silica is employed as a granular or powder flow aid. Thus, a level of 10% or greater loading is unexpected.

Hydrophobicity

Another important factor in flow improvement is the surface chemical nature of silica used. As suggested in Table 3 and FIG. 6, hydrophobic silica (Sipernat® D13) works much better than hydrophilic silica (Sipernat® 22LS)(see Table 1). Together with results from Table 2 and FIG. 5, a conclusion can be made that unusually high loadings of silica may be lowered to some extent if the right surface chemical nature of silica is chosen (hydrophobicity). Sipernat® D13 works at a loading of 3 wt % (still higher than conventional loading) comparable to Syloid® 244 at a loading of 20 wt %. While not being limited by mechanism, it is believed that there may be improved compatibility between the DMDBS particle surface and the hydrophobic silica particle surface, which may lead to more effective flowability improvement for hydrophobic silica grades. In general, hydrophobic silica shows improved performance as compared to hydrophilic silica, especially at submicron loadings.

Particle Size

Another key factor that controls flowability potential for additive compositions of sorbitol acetal compounds with silica is the particle size of the silica employed. Table 4 and FIG. 7 demonstrate the flow improving performance of two different fumed silica grades. Fumed silica is submicron in size, and significantly smaller than micron sized silica. Fumed silica performs well in the practice of the invention.

Comparison was made between these two silica grades, which both are in the submicron size range, but have a different surface chemical nature (Aerosil® R972 is hydrophobic, and Aerosile 300 is hydrophilic). They both significantly improve the flow properties of DMDBS powder. They improve the flow properties of DMDBS significantly better than micron size silica grades (Sipernat® D13 and Sipemat® 22LS).

Pilot Scale Trial

To optimize the process and verify the findings, a pilot scale trial using an industrial blender was performed. The cohesive strength data confirmed the findings described above. The formulation of DMDBS with silica has significantly better flow properties than DMDBS without silica. At the same time, the hydrophobic surface and submicron size of Aerosil® R972 (as one example) renders a much lower effective loading than Syloid® 244 (Table 2 and FIG. 5).

It is understood by one of ordinary skill in the art that the present discussion is a description of exemplary embodiments only, and is not intended as limiting the broader aspects of the present invention. The invention is shown by example in the appended claims, but is not limited to such examples.

The invention claimed is:

1. An additive composition comprising a physical blend of two or more components, the physical blend comprising:
   (a) a sorbitol acetal compound, and
   (b) a substantially hydrophobic silica,
   wherein the weight percentage of hydrophobic silica in the additive composition is from about 1% to about 30% based on the total weight of the sorbitol acetal compound and the substantially hydrophobic silica.

2. A composition according to claim 1 wherein the weight percentage of hydrophobic silica in the additive composition is from about 1% to about 10% based on the total weight of the sorbitol acetal compound and the substantially hydrophobic silica.

3. A composition according to claim 1 wherein the weight percentage of hydrophobic silica in the additive composition is from about 1% to about 5% based on the total weight of the sorbitol acetal compound and the substantially hydrophobic silica.

4. A polymeric or copolymeric article of manufacture comprising the additive composition of claim 1.

5. The additive composition of claim 1 wherein said silica exhibits a Mv value of less than about 0.6 µm and a D90 value of less than about 1 µm.

6. The composition of claim 1 wherein said silica exhibits a Mv value of less than about 0.4 µm and a D90 value of less than about 0.6 µm.

7. The composition of claim 1, wherein said silica exhibits an Mv value of less than about 20 µm and a D90 value of less than about 50 µm.

8. A nucleating agent additive composition that is substantially free of organic lubricating agents, said additive composition consisting essentially of a physical blend of two or more components, the physical blend consisting essentially of:
   (a) a sorbitol acetal compound, and
   (b) a substantially hydrophobic silica component, said substantially hydrophobic silica component having:
      a Mv of less than about 20 µm, and
      a D90 value of less than 50 µm,
   wherein the weight percentage of the substantially hydrophobic silica component in the additive composition is from about 1% to about 10% based on the total weight of the sorbitol acetal compound and the substantially hydrophobic silica component.

9. An additive composition comprising a physical blend of two or more components, the physical blend comprising:
   (a) a xylitol acetal compound, and
   (b) hydrophobic silica,
   wherein the weight percentage of hydrophobic silica in the additive composition is from about 1% to about 30% based on the total weight of the xylitol acetal compound and the hydrophobic silica.

10. A composition according to claim 9 wherein the weight percentage of hydrophobic silica in the additive composition is from about 1% to about 10% based on the total weight of the xylitol acetal compound and the hydrophobic silica.

* * * * *